(12) United States Patent
Zhao et al.

(10) Patent No.: US 10,658,857 B2
(45) Date of Patent: May 19, 2020

(54) POWER MANAGEMENT CIRCUIT AND MOBILE TERMINAL

(71) Applicant: Silergy Semiconductor Technology (Hangzhou) LTD, Hangzhou, ZheJiang Province (CN)

(72) Inventors: Chen Zhao, Hangzhou (CN); Lingdong Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/017,395

(22) Filed: Jun. 25, 2018

(65) Prior Publication Data

US 2018/0309313 A1 Oct. 25, 2018

Related U.S. Application Data

(63) Continuation of application No. 14/959,205, filed on Dec. 4, 2015, now Pat. No. 10,027,155.

(30) Foreign Application Priority Data

Dec. 4, 2014 (CN) .......................... 2014 1 0733941

(51) Int. Cl.
*H02J 7/00* (2006.01)
*H02M 3/158* (2006.01)

(52) U.S. Cl.
CPC ......... *H02J 7/0068* (2013.01); *H02M 3/1582* (2013.01); *H02J 7/00* (2013.01); *H02J 2207/20* (2020.01)

(58) Field of Classification Search
CPC .................. H02J 7/0068; H02J 7/0052; H02J 2007/0059; H02M 3/1582
USPC .......................................................... 307/31
See application file for complete search history.

(56) References Cited

U.S. PATENT DOCUMENTS

| 9,634,512 B1 | 4/2017 | Kim et al. | |
| 2005/0151517 A1* | 7/2005 | Cook | B60R 16/03 323/207 |
| 2011/0115295 A1* | 5/2011 | Moon | H02J 3/32 307/65 |
| 2011/0140520 A1* | 6/2011 | Lee | H01L 31/02021 307/25 |
| 2011/0140648 A1* | 6/2011 | Lee | H02J 3/32 320/101 |
| 2011/0148195 A1* | 6/2011 | Lee | H02J 7/35 307/25 |
| 2011/0148360 A1* | 6/2011 | Lee | H02J 7/35 320/134 |

(Continued)

FOREIGN PATENT DOCUMENTS

| CN | 103023320 A | 4/2013 |
| CN | 203261080 U | 10/2013 |

(Continued)

*Primary Examiner* — Ryan Jager

(57) ABSTRACT

The present disclosure relates to a power management circuit and a mobile terminal having a first switch for blocking current. The first switch blocks an input of an external power supply in a case that a predetermined load operates in a large current/voltage mode. A bi-directional DC converter boosts a battery voltage and supplies it to the load. Thus, the circuit is simplified and the number of components is reduced for power management.

10 Claims, 4 Drawing Sheets

(56) References Cited

U.S. PATENT DOCUMENTS

| | | | | |
|---|---|---|---|---|
| 2015/0280486 A1* | 10/2015 | Hsu | ............... | H02M 3/1582 |
| | | | | 320/107 |
| 2015/0311720 A1* | 10/2015 | Zhao | ............... | H02J 7/022 |
| | | | | 307/80 |
| 2016/0056657 A1* | 2/2016 | Hang | ............... | H02J 7/0068 |
| | | | | 320/128 |
| 2017/0346401 A1* | 11/2017 | Kuroda | ............... | H02M 1/08 |

FOREIGN PATENT DOCUMENTS

| | | |
|---|---|---|
| CN | 103986223 A | 8/2014 |
| CN | 104092277 A | 10/2014 |
| CN | 104348225 A | 2/2015 |
| JP | 2003-244863 A | 8/2003 |
| JP | 2013-183562 A | 9/2013 |

\* cited by examiner

POWER MANAGEMENT CIRCUIT AND MOBILE TERMINAL

CLAIM OF PRIORITY

This application is a continuation of the following application, U.S. patent application Ser. No. 14/959,205, filed on Dec. 4, 2015, and which is hereby incorporated by reference as if it is set forth in full in this specification, and which also claims priority to Chinese Application No. 201410733941.6, filed on Dec. 4, 2014 (published as CN 104467411 A), which is hereby incorporated by reference in its entirety.

BACKGROUND OF THE DISCLOSURE

Field of the Disclosure

The present disclosure relates to the field of power electronics, and more particularly, to a power management circuit and a mobile terminal.

Description of the Related Art

More and more electronic devices and functionalities are added in a mobile terminal, which means that the mobile terminal drives many different types of loads, with challenges in power management. The power management circuit should firstly charge a rechargeable battery, such as a lithium battery, secondly supply electric energy to a system part of the mobile terminal, and finally supply electric energy to an external load which is electrically coupled to the mobile terminal as a load in an OTG mode or in a On The Go mode. Further, the power management circuit may need to supply a large voltage or current to some loads, such as LED loads, in some modes.

A conventional power management circuit needs several power stages to operate together for the above functionalities, and has a complex circuit configuration. When the power management circuit is formed as an integrated circuit, it will have a large footprint and be costly.

BRIEF DESCRIPTION OF THE DISCLOSURE

In view of this, the present disclosure provides a power management circuit and a mobile terminal, which simplifies a circuit structure for supplying a relatively large voltage or current to some loads such as LED loads in some modes while reducing the number of components.

According to a first aspect, there is provided a power management circuit comprising:

a bi-directional DC converter comprising a low-voltage terminal, a first high-voltage terminal and a second high-voltage terminal, for converting a first voltage at the first high-voltage terminal into a second voltage and supply the second voltage at the low-voltage terminal in a buck mode, or for converting the second voltage at the low-voltage terminal into the first voltage and supply the first voltage at the first high-voltage terminal in a first boost mode, or for converting the second voltage at the low-voltage terminal into a third voltage and supply the third voltage at the second high-voltage terminal in a second boost mode;

a supply terminal for being electrically coupled to an external power supply or a first load;

a load terminal for being electrically coupled to a second load;

a capacitor being electrically coupled between the load terminal and a ground terminal;

a first switch being electrically coupled between the supply terminal and the first high-voltage terminal, and configured to be turned off in a case that the second load operates in the first mode and the supply terminal is electrically coupled to the external power supply, wherein the power management circuit is configured to electrically couple the second high-voltage terminal to the load terminal and output electric energy to the load terminal by controlling the bi-directional DC converter to operate in the second boost mode, in a case that the second load operates in the first mode.

Here, the first load may be a predetermined load, such as an LED load, and the second load is an external load.

Preferably, the bi-directional DC converter operates in the second boost mode in a case that the second load operates in the first mode or in a second mode, in the first boost mode in a case that the supply terminal is electrically coupled to the first load, and in the buck mode in a case that the supply terminal is electrically coupled to the external power supply and the second load is inactive, the first switch is turned off in a case that the second load is active.

Preferably, the bi-directional DC converter comprises:

a second switch electrically coupled between the first high-voltage terminal and an intermediate terminal;

a third switch electrically coupled between the intermediate terminal and ground;

a fourth switch electrically coupled between the intermediate terminal and the second high-voltage terminal;

an inductor electrically coupled between the intermediate terminal and the low-voltage terminal, wherein the third switch and the fourth switch are operatively turned on and off to supply the third voltage at the second high-voltage terminal, in a case that the second load operates in the first mode or in the second mode, the third switch and the second switch are turned on and off to supply the first voltage at the first high-voltage terminal, in a case that the supply terminal is electrically coupled to the first load, and the second switch and the third switch are operatively turned on and off to supply the second voltage at the low-voltage terminal, in a case that supply terminal is electrically coupled to the external power supply and the second load is inactive.

According to a second aspect, there is provided a power management circuit, comprising:

a bi-directional DC converter comprising a low-voltage terminal, and a high-voltage terminal, and configured to convert a first voltage at the high-voltage terminal into a second voltage and supply the second voltage at the low-voltage terminal in a buck mode, or to convert the second voltage at the low-voltage terminal into the first voltage and supply the first voltage at the high-voltage terminal in a boost mode;

a supply terminal for being electrically coupled to an external power supply or a first load;

a load terminal for being electrically coupled to a second load;

a capacitor being electrically coupled between the load terminal and a ground terminal;

a first switch being electrically coupled between the supply terminal and the high-voltage terminal, and configured to be turned off in a case that the second load operates in the first mode and the supply terminal is electrically coupled to the external power supply, wherein the power management circuit is configured to electrically couple the high-voltage terminal to the load terminal and output electric energy to the load terminal by controlling the bi-directional DC converter to operate in the boost mode, in a case that the second load operates in the first mode.

Preferably, the bi-directional DC converter comprises a second switch electrically coupled between the high-voltage terminal and an intermediate terminal;

a third switch electrically coupled between the intermediate terminal and ground;

an inductor electrically coupled between the intermediate terminal and the low-voltage terminal, wherein the bi-directional DC converter operates in the boost mode, in a case that the second load operates in the first mode and the supply terminal is not electrically coupled to the external power supply, and/or in a case that the supply terminal is electrically coupled to the first load, the bi-directional DC converter operates in the buck mode, in a case that the second load operates in a second mode, or in a case that the supply terminal is electrically coupled to the external power supply and the second load is inactive.

Preferably, the power management circuit further comprises:

a battery terminal for being electrically coupled to a rechargeable battery;

a charge switch being electrically coupled between the low-voltage terminal and the batter terminal;

a fifth switch being electrically coupled between the battery terminal and the load terminal, and configured to be turned on in a case that the second load operates in the second mode and the supply terminal is not electrically coupled to the external power supply or the first load.

Preferably, the bi-directional DC converter comprises:

a second switch electrically coupled between the high-voltage terminal and an intermediate terminal;

a third switch electrically coupled between the intermediate terminal and ground;

an inductor electrically coupled between the intermediate terminal and the low-voltage terminal, wherein the bi-directional DC converter operates in the boost mode, in a case that the second load operates in the first mode, or in a case that the second load operates in the second mode and the supply terminal is not electrically coupled to the external power supply, or in a case that the supply terminal is electrically coupled to the first load, and the bi-directional DC converter operates in the buck mode, in a case that the second load operates in the second mode and the supply terminal is electrically coupled to the external power supply.

Preferably, the power management circuit further comprises:

a sixth switch being electrically coupled between the low-voltage terminal and the load terminal, and configured to be turned on in a case that the supply terminal is electrically coupled to the external power supply and the second load operates in the second mode;

a seventh switch being electrically coupled between the high-voltage terminal and the load terminal, and configured to be turned on in a case that the second load operates in the first mode, or in a case that the second load operates in the second mode and the supply terminal is not electrically coupled to the external power supply.

Preferably, the power management circuit further comprises:

a battery terminal for being electrically coupled to a rechargeable battery;

a charge switch being electrically coupled between the low-voltage terminal and the batter terminal.

According to a third aspect, there is provided a mobile terminal, comprising:

a rechargeable battery;

a second load;

the above-mentioned power management circuit.

The power management circuit has a first switch for blocking current. The first switch blocks an input of an external power supply in a case that a predetermined load operates in a large current/voltage mode. A bi-directional DC converter boosts a battery voltage and supplies it to the load. Thus, the circuit is simplified and the number of components is reduced for power management.

BRIEF DESCRIPTION OF THE DRAWINGS

The above and other objects, advantages and features of the present disclosure will become more fully understood from the detailed description given herein below in connection with the appended drawings, and wherein.

DETAILED DESCRIPTION OF EMBODIMENTS OF THE DISCLOSURE

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present Furthermore, it will be understood by one skilled in the art that attached drawings are to be regard as illustrative, and may not be drawn to scale.

Also, it will be understood in the following description that the term "circuit" refers to a conductive loop consisting of at least one component or sub-circuit which are electrically coupled or electromagnetically coupled. When one component/circuit is referred to as being "connected to" another component, or one component/circuit is referred to as being "connected between" two nodes, it can be connected with or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as being used herein, is defined as two or more than two, unless something otherwise is specifically stated.

In some embodiments of the present disclosure, the description is made with a mobile terminal or an LED load in an electric equipment as an example of a load which operates in a large voltage/current mode. Nevertheless, these embodiments also apply for other types of loads.

An LED load of a mobile terminal typically operates in two different modes, including a flashlight mode (also referred to as a "first mode") and a torch mode (also referred as to a "second mode"). In the flashlight mode, the LED load flashes in a short time period and needs to be supplied with a large current or voltage in the short time period. In the torch mode, the LED load emits light continuously and needs to be supplied either with a large current or voltage, or with a small current or voltage.

Figure 1:
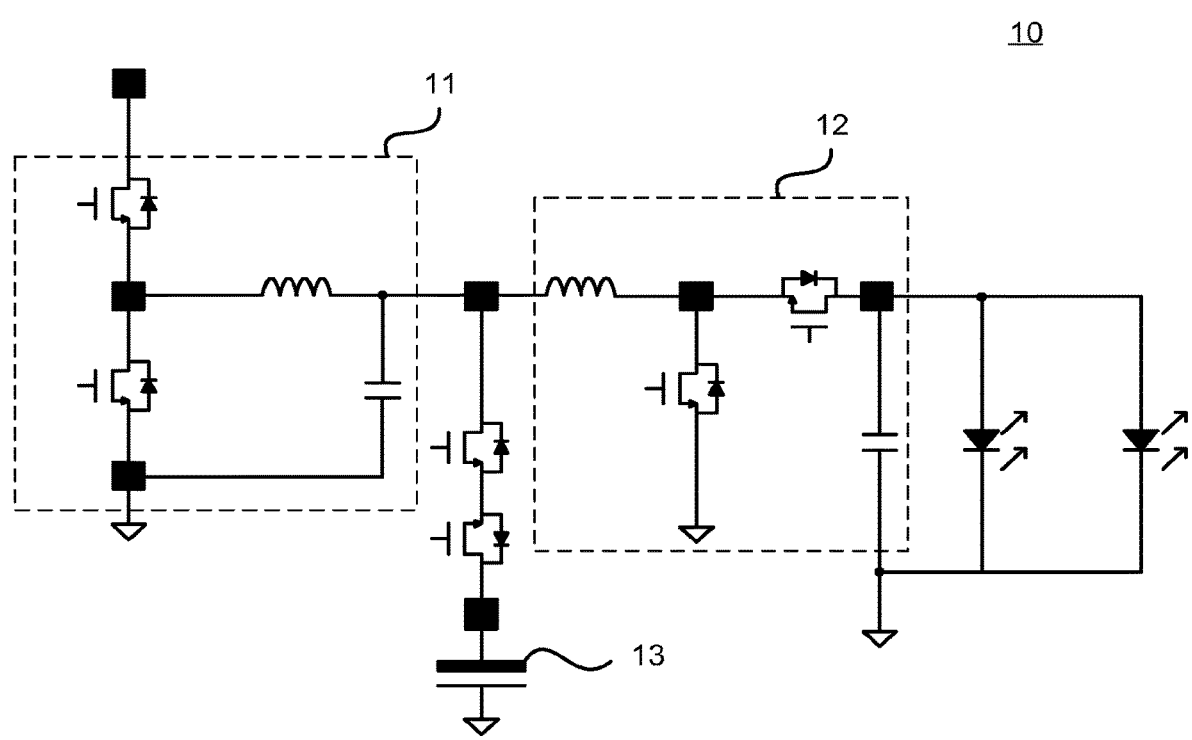
FIG. 1 is a schematic circuit diagram of an example power management circuit according to the prior art.

FIG. 1 is a schematic circuit diagram of an example power management circuit according to the prior art. Referring to FIG. 1, the power management circuit 10 includes a first DC converter 11 and a second DC converter 12 which are connected in series with each other. The first DC converter 11 has a buck-type topology or a bi-directional topology, and the second DC converter 12 has a boost-type topology. In a case that a supply terminal IN is connected with an external power supply, the first DC converter 11 bucks a voltage of the external power supply and supplies it to a battery 13 for charging. Meanwhile, the second DC converter 12 boosts the bucked voltage for driving the LED load. In a case that the supply terminal IN is not connected with the external power supply, the first DC converter 11 is inactive. Meanwhile, the second DC converter 12 boosts a battery voltage for driving the LED load. Two DC converters are used, including many components. Especially, two inductors are used, which increases a size of the circuit.

Figure 2:
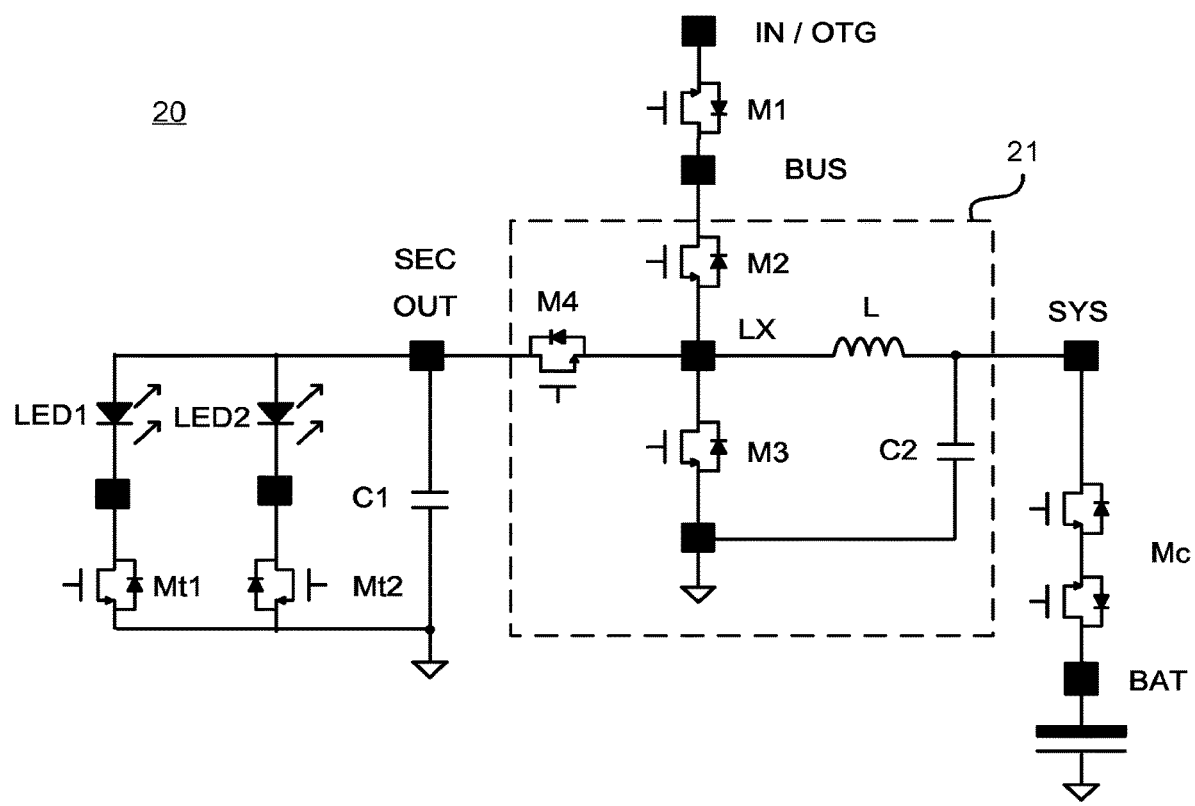
FIG. 2 is a schematic circuit diagram of an example power management circuit according to a first embodiment of the present disclosure.

FIG. 2 is a schematic circuit diagram of an example power management circuit according to a first embodiment of the present disclosure. Referring to FIG. 2, the power management circuit 20 includes a bi-directional DC converter 21, a supply terminal IN/OTG, a load terminal OUT, a capacitor C1 and a first switch M1.

The supply terminal IN/OTG is used for being connected with an external power supply or an external load, for supplying a supply voltage to the power management circuit 20, or for supplying a driving voltage from the power management circuit to the external load.

The load terminal OUT is used for being connected with a predetermined load. In this embodiment, the predetermined load is an LED load.

The capacitor C1 is connected between the load terminal OUT and ground, for filtering an output voltage.

The bi-directional DC converter 21 includes a low-voltage terminal SYS, a first high-voltage terminal BUS and a second high-voltage terminal SEC. The bi-directional DC converter 21 performs bi-directional DC conversion. That is, the bi-directional DC converter 21 converts a first voltage at the first high-voltage terminal BUS into a second voltage and supply the second voltage at the low-voltage terminal SYS in a buck mode, or converts the second voltage at the low-voltage terminal SYS into the first voltage and supply the first voltage at the first high-voltage terminal BUS in a first boost mode, or to convert the second voltage at the low-voltage terminal SYS into a third voltage and supply the third voltage at the second high-voltage terminal SEC in a second boost mode.

Both the first voltage and the third voltage are larger than the second voltage. The first voltage and the third voltage may be determined in accordance with the external load and the LED load.

The first switch M1 is connected between the first high-voltage terminal BUS and the supply terminal IN/OTG. The second high-voltage terminal SEC is connected directly with the load terminal OUT. Accordingly, the first high-voltage terminal BUS may be used for receiving an input voltage from the external power supply or providing an output voltage, for supplying electric energy to the external load.

In this embodiment, the first switch M1 is connected with the high-voltage terminal BUS and should have a large breakdown voltage.

In this embodiment, the bi-directional DC converter 21 may be a switching-type converter as shown in FIG. 2. The bi-directional DC converter 21 includes a second switch M2, a third switch M3, a fourth switch M4 and an inductor L. The second switch M2 is connected between the first high-voltage terminal BUS and an intermediate terminal LX. The third switch M3 is connected between the intermediate terminal LX and ground. The fourth switch M4 is connected between the intermediate terminal LX and the second high-voltage terminal SEC. The inductor L is connected between the intermediate terminal LX and the low-voltage terminal SYS.

When a supply voltage from the external power supply is detected at the supply terminal IN/OTG, it is determined that the supply terminal IN/OTG is connected with the external power supply. The first switch M1 is turned on so that the supply voltage at the supply terminal is transferred to the first high-voltage terminal BUS through the first switch M1. The second switch M2 and the third switch M3 are operatively turned on and off so that the bi-directional DC converter 21 bucks the voltage at the first high-voltage terminal BUS and supplies it to the low-voltage terminal SYS. The voltage at the low-voltage terminal SYS is used for charging the battery and supplying electric energy to the mobile terminal. The bi-directional DC converter 21 operates in a buck mode, in which the second switch M2 is a main power switch and the third switch M3 is a synchronous rectifying switch.

When the external load is detected to be connected with the supply terminal, the first switch M1 is turned on so that the voltage at the first high-voltage terminal BUS is transferred to the supply terminal IN/OTG. The third switch M3 and the second switch M2 are operatively turned on and off so that the bi-directional DC converter 21 receives a battery voltage at the low-voltage terminal SYS, and boosts and supplies it to the first high-voltage terminal BUS for supplying electric energy to the external load. The bi-directional DC converter 21 now has a boost topology, in which the third switch M3 is a main power switch and the second switch M2 is a synchronous rectifying switch.

When the LED load is active, the bi-directional DC converter 21 in this embodiment boosts the battery voltage to a third voltage having a larger value for driving the LED load, no matter whether the LED load operates in a flashlight mode (i.e. a first mode), or in a torch mode (i.e. a second mode). In such case, the first switch M1 is turned off to stop charging or supplying electric energy. The third switch M3 and the fourth switch M4 are operatively turned on and off so that the bi-directional DC converter 21 receives a battery voltage at the low-voltage terminal SYS, and boosts and supplies it to the second high-voltage terminal SEC. The second high-voltage terminal SEC is directly connected with the load terminal OUT. Thus, the boosted voltage is directly transferred to the LED load for driving the LED load.

In this embodiment, the bi-directional DC converter 21 operates in a constant voltage mode. Adjustment transistors Mt1 and Mt2 are connected in series with LED strings, respectively. The adjustment transistors Mt1 and Mt2 operate in a linear mode for supplying a constant driving current, as required by the LED load.

In this embodiment, the power management circuit 20 further includes a battery terminal BAT and a charge switch Mc. The battery terminal BAT is used for being connected with a rechargeable battery, such as a lithium battery. The charge switch Mc is connected between the battery terminal BAT and the low-voltage terminal SYS, for controlling a charging current of the battery. The charge switch Mc may operate in a linear mode, for maintaining a relatively small charging current. Further, the charge switch Mc may be completely turned on when charging or discharging with a large current, and be completely turned off after charging and discharging. The charge switch Mc needs to block a charging current or a discharging current in two opposite directions. Two metal-oxide-semiconductor field effect transistors (MOSFETs) may be connected in series and with their sources being adjacent to each other. Thus, the two MOSFETs will be turned on or off simultaneously. It should be understood by one skilled person that the charge switch Mc may be omitted in some cases, and the battery terminal BAT and the low-voltage terminal SYS may be formed as the same one terminal.

In this embodiment, the bi-directional DC converter 21 further includes a capacitor C2 which is connected between the low-voltage terminal SYS and ground, for filtering the output voltage.

The power management circuit according to this embodiment includes a first switch for blocking current, which blocks an input of the external power supply in a case that the LED load operates in a flashlight mode. Moreover, a bi-directional DC converter having two high-voltage terminals is used for boosting a battery voltage and supplying it to the LED load. In a case that the LED load is inactive, the bi-directional DC converter operates to charge the battery by the external power supply, or to supply electric energy to the load. Thus, a single bi-directional DC converter can fulfill the requirements of power management, which simplifies the circuit structure and reduces the number of components.

Figure 3:
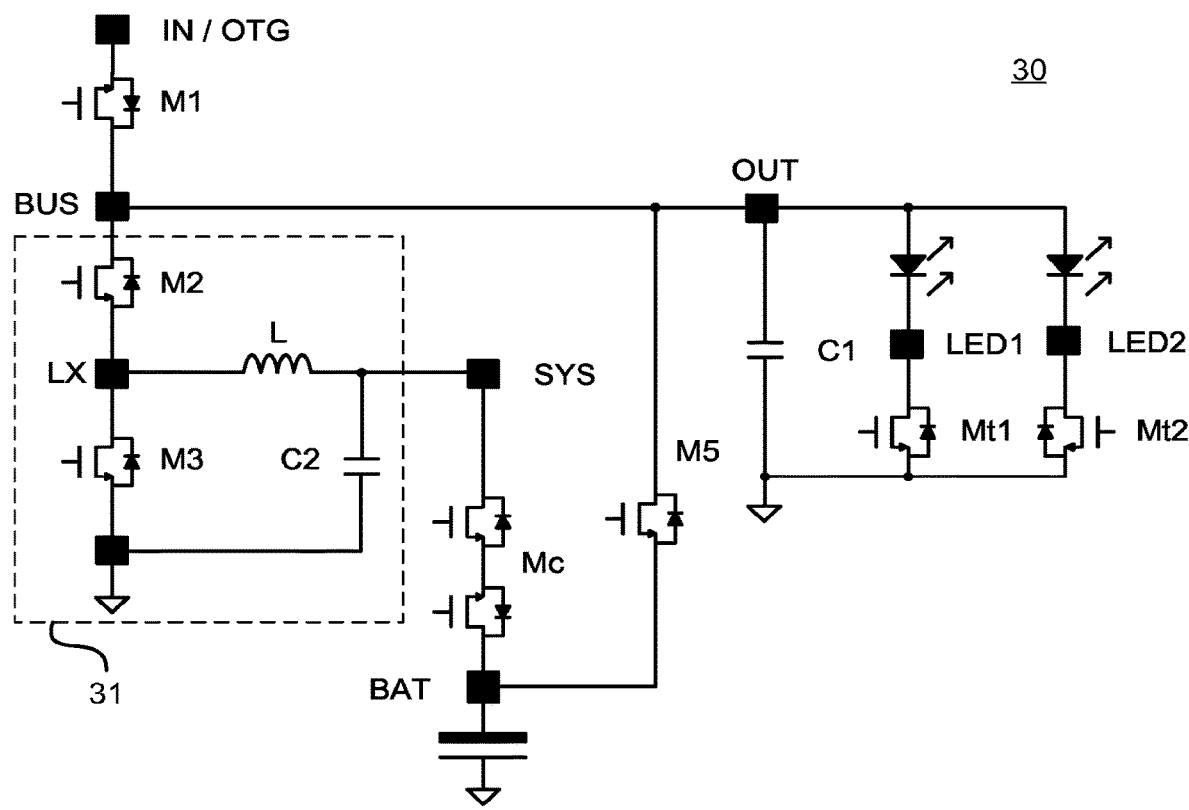
FIG. 3 is a schematic circuit diagram of an example power management circuit according to a second embodiment of the present disclosure.

FIG. 3 is a schematic circuit diagram of an example power management circuit according to a second embodiment of the present disclosure. Referring to FIG. 3, the power management circuit 30 includes a bi-directional DC converter 31, a supply terminal IN/OTG, a load terminal OUT, a capacitor C1 and a first switch M1.

The supply terminal IN/OTG is used for being connected with an external power supply or an external load, for supplying a supply voltage to the power management circuit 30, or for supplying a driving voltage from the power management circuit to the external load.

The load terminal OUT is used for being connected with a predetermined load. In this embodiment, the predetermined load is an LED load.

The capacitor C1 is connected between the load terminal OUT and ground, for filtering an output voltage.

The bi-directional DC converter 31 includes a low-voltage terminal SYS, and a high-voltage terminal BUS. The bi-directional DC converter 31 converts a first voltage at the high-voltage terminal BUS into a second voltage and supply the second voltage at the low-voltage terminal SYS, or converts the second voltage at the low-voltage terminal SYS into the first voltage and supply the first voltage at the high-voltage terminal BUS. The first voltage is larger than the second voltage.

The first switch M1 is connected between the high-voltage terminal BUS and the supply terminal IN/OTG.

The high-voltage terminal BUS is connected with the first switch M1 and is coupled to the load terminal OUT. In this embodiment, the high-voltage terminal BUS is connected directly with the load terminal OUT.

In this embodiment, the bi-directional DC converter 31 may be a switching-type converter as shown in FIG. 3. The bi-directional DC converter 31 includes a second switch M2, a third switch M3, a fourth and an inductor L. The second switch M2 is connected between the high-voltage terminal BUS and an intermediate terminal LX. The third switch M3 is connected between the intermediate terminal LX and ground. The inductor L is connected between the intermediate terminal LX and the low-voltage terminal SYS.

The bi-directional DC converter 31 converts the first voltage at the high-voltage terminal BUS into the second voltage and supplies it to the low-voltage terminal SYS, by operatively turning on and off the second switch M2 and the third switch M3. The bi-directional DC converter 31 operates in a buck mode, in which the second switch M2 is a main power switch and the third switch M3 is a synchronous rectifying switch.

The bi-directional DC converter 31 also converts the second voltage at the low-voltage terminal SYS into the first voltage and supplies it to the high-voltage terminal BUS, by operatively turning on and off the third switch M3 and the second switch M2. The bi-directional DC converter 31 operates in a boost mode, in which the third switch M3 is a main power switch and the second switch M2 is a synchronous rectifying switch.

In this embodiment, the power management circuit 30 further includes a battery terminal BAT and a charge switch Mc. The battery terminal BAT is used for being connected with a rechargeable battery. The charge switch Mc is connected between the battery terminal BAT and the low-voltage terminal SYS, for controlling a charging current of the battery. The charge switch Mc may operate in a linear mode, for maintaining a relatively small charging current. Further, the charge switch Mc may be completely turned on when charging or discharging with a large current, and be completely turned off after charging and discharging. Moreover, the power management circuit 30 may also include a fifth switch M5. The fifth switch M5 is connected between the battery terminal BAT and the load terminal OUT, and is turned on in a case that the LED load operates in the second mode and the supply terminal IN/OTG is not connected with the external power supply or the external load, for receiving the battery voltage for driving the LED load.

When a supply voltage from the external power supply is detected at the supply terminal IN/OTG, the first switch M1 is turned on so that the supply voltage at the supply terminal is transferred to the high-voltage terminal BUS through the first switch M1. The bi-directional DC converter 31 operates in a buck mode for bucking a voltage at the high-voltage terminal BUS and supplying it to the low-voltage terminal SYS. The voltage at the low-voltage terminal SYS is used for charging the battery and supplying electric energy to other parts of the system. In a case that the LED load operates in a flashlight mode, the voltage at the high-voltage terminal BUS, which has a larger value, is used directly for driving the LED load to emit light continuously. In a case that the LED load operates in a flashlight mode, the first switch M1 is turned off for blocking an input of the external power supply. The bi-directional DC converter 31 operates in a boost mode, in which the bi-directional DC converter 31 receives a battery voltage at the low-voltage terminal SYS, and boosts and supplies it at the high-voltage terminal BUS. The boosted voltage is further transferred to the load terminal OUT for driving the LED load. Thus, the LED load may operate with a higher voltage as a driving voltage.

When the external load is detected to be connected with the supply terminal, the first switch M1 is turned on so that the voltage at the high-voltage terminal BUS is transferred to the supply terminal IN/OTG. The bi-directional DC converter 31 receives a battery voltage at the low-voltage terminal SYS, and boosts and supplies it to the high-voltage terminal BUS for supplying electric energy to the external load.

In a case that the supply terminal is not connected with an external device, and the LED load operates in a flashlight mode, the bi-directional DC converter 31 receives a battery voltage at the low-voltage terminal SYS, and boosts and supplies it to the high-voltage terminal BUS for supplying electric energy to the LED load. In a case that the LED load operates in a torch mode, the fifth switch M5 is turned on and the battery voltage is directly used for driving the LED load.

In this embodiment, the bi-directional DC converter 21 further includes a capacitor C2 which is connected between the low-voltage terminal and ground, for filtering the output voltage.

The power management circuit according to this embodiment includes a first switch for blocking current, which blocks an input of the external power supply in a case that the LED load operates in a flashlight mode. Moreover, a bi-directional DC converter having one high-voltage terminal is used for boosting a battery voltage and supplying it to the LED load. In a case that the LED load is inactive, the bi-directional DC converter operates to charge the battery by the external power supply, or to supply electric energy to the load. Thus, a single bi-directional DC converter can fulfill the requirements of power management, which simplifies the circuit structure and reduces the number of components.

Figure 4:
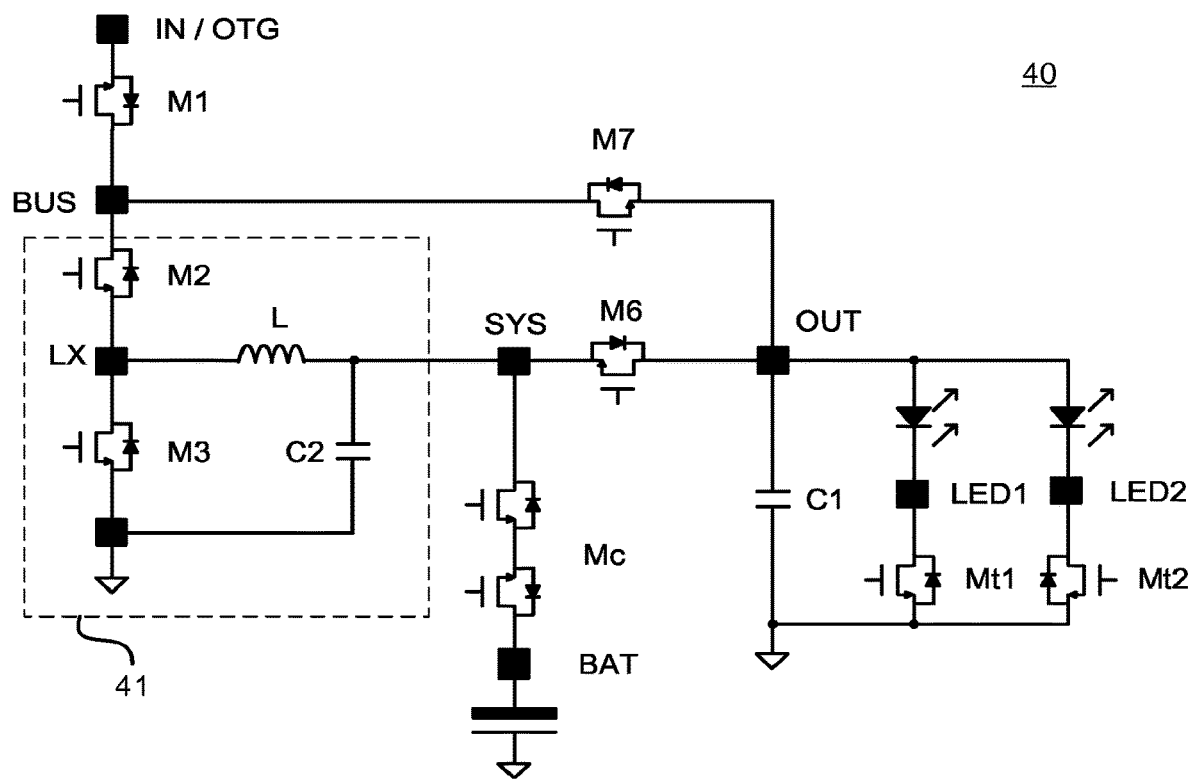
FIG. 4 is a schematic circuit diagram of an example power management circuit according to a third embodiment of the present disclosure.

FIG. 4 is a schematic circuit diagram of an example power management circuit according to a third embodiment of the present disclosure. Referring to FIG. 4, the power management circuit 40 includes a bi-directional DC converter 41, a supply terminal IN/OTG, a load terminal OUT, a capacitor C1 and a first switch M1.

The supply terminal IN/OTG is used for being connected with an external power supply or an external load, for supplying a supply voltage to the power management circuit 40, or for supplying a driving voltage from the power management circuit 40 to the external load.

The load terminal OUT is used for being connected with a predetermined load. In this embodiment, the predetermined load is an LED load.

The capacitor C1 is connected between the load terminal OUT and ground, for filtering an output voltage.

The bi-directional DC converter 41 includes a low-voltage terminal SYS, and a high-voltage terminal BUS. The bi-directional DC converter 41 converts a first voltage at the high-voltage terminal BUS into a second voltage and supply the second voltage at the low-voltage terminal SYS, or converts the second voltage at the low-voltage terminal SYS into the first voltage and supply the first voltage at the high-voltage terminal BUS. The first voltage is larger than the second voltage.

The first switch M1 is connected between the high-voltage terminal BUS and the supply terminal IN/OTG.

The high-voltage terminal BUS is connected with the first switch M1 and is coupled to the load terminal OUT. In this embodiment, the high-voltage terminal BUS is connected with the load terminal OUT through a seventh switch M7. That is, the seventh switch M7 is connected between the high-voltage terminal BUS and the load terminal OUT.

In this embodiment, the bi-directional DC converter 41 may be a switching-type converter as shown in FIG. 4. The bi-directional DC converter 41 includes a second switch M2, a third switch M3, a fourth and an inductor L. The second switch M2 is connected between the high-voltage terminal BUS and an intermediate terminal LX. The third switch M3 is connected between the intermediate terminal LX and ground. The inductor L is connected between the intermediate terminal LX and the low-voltage terminal SYS.

The bi-directional DC converter 41 converts the first voltage at the high-voltage terminal BUS into the second voltage and supplies it to the low-voltage terminal SYS, by operatively turning on and off the second switch M2 and the third switch M3. The bi-directional DC converter 41 operates in a buck mode, in which the second switch M2 is a main power switch and the third switch M3 is a synchronous rectifying switch.

The bi-directional DC converter 41 also converts the second voltage at the low-voltage terminal SYS into the first voltage and supplies it to the high-voltage terminal BUS, by operatively turning on and off the third switch M3 and the second switch M2. The bi-directional DC converter 41 operates in a boost mode, in which the third switch M3 is a main power switch and the second switch M2 is a synchronous rectifying switch.

In this embodiment, the power management circuit 40 further includes a sixth switch M6 which is connected between the low-voltage terminal SYS and the load terminal OUT.

When a supply voltage from the external power supply is detected at the supply terminal IN/OTG, the first switch M1 is turned on so that the supply voltage at the supply terminal is transferred to the high-voltage terminal BUS through the first switch M1. The bi-directional DC converter 41 operates in a buck mode for bucking a voltage at the high-voltage terminal BUS and supplying it to the low-voltage terminal SYS. The voltage at the low-voltage terminal SYS is used for charging the battery and supplying electric energy to other parts of the system. The voltage at the low-voltage terminal SYS is a stable and bucked voltage supplied from the converter. In a case that the LED load operates in a torch mode, the sixth switch M6 is turned on and the seventh transistor M7 is turned off, and the voltage at the low-voltage terminal SYS, which has a smaller value, is used for driving the LED load to emit light continuously. In a case that the LED load operates in a flashlight mode, the first switch M1 is temporarily turned off. The bi-directional DC converter 41 receives a battery voltage at the low-voltage terminal SYS, and boosts and supplies it at the high-voltage terminal BUS. The bi-directional DC converter 41 supplies a voltage having a larger value for driving the LED load.

When the external load is detected to be connected with the supply terminal, the first switch M1 is turned on so that the voltage at the high-voltage terminal BUS is transferred to the supply terminal IN/OTG. The bi-directional DC converter 31 receives a battery voltage at the low-voltage terminal SYS, and boosts and supplies it to the high-voltage terminal BUS for supplying electric energy to the external load. In such case, the voltage at the low-voltage terminal is the battery voltage, which is unstable. The sixth switch M6 is turned off and the seventh switch M7 is turned on, for supplying a voltage having a larger value at the high-voltage terminal BUS for driving the LED load, no matter whether the LED load operates in a flashlight mode or in a torch mode.

In a case that the supply terminal is not connected with an external device, the bi-directional DC converter 41 operates in a boost mode, in which the bi-directional DC converter receives a battery voltage at the low-voltage terminal SYS, and boosts and supplies it to the high-voltage terminal BUS, no matter whether the LED load operates in a flashlight mode or in a torch mode. The sixth switch M6 is turned off and the seventh switch M7 is turned on, for supplying the voltage at the high-voltage terminal BUS to the LED load. It avoids an unstable driving voltage of the LED load when electric energy is supplied directly from the battery.

Preferably, the power management circuit 40 according to this embodiment further includes a battery terminal BAT and a charge switch Mc. The battery terminal BAT is used for being connected with a rechargeable battery. The charge switch Mc is connected between the battery terminal BAT and the low-voltage terminal SYS, for controlling a charging current of the battery. The charge switch Mc may operate in a linear mode, for maintaining a relatively small charging current. Further, the charge switch Mc may be completely turned on when charging or discharging with a large current, and be completely turned off after charging and discharging.

The power management circuit according to this embodiment includes a first switch for blocking current, which blocks an input of the external power supply in a case that the LED load operates in a flashlight mode. Moreover, a bi-directional DC converter having one high-voltage terminal is used for boosting a battery voltage and supplying it to the LED load. In a case that the LED load is inactive, the bi-directional DC converter operates to charge the battery by the external power supply, or to supply electric energy to the load. Thus, a single bi-directional DC converter can fulfill the requirements of power management, which simplifies the circuit structure and reduces the number of components.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

What is claimed is:

1. A power management circuit, comprising:
   a bi-directional DC converter comprising a supply terminal for receiving an external power supply or a first load, a load terminal, and a common inductor coupled between said supply terminal and a rechargeable battery;
   a second load having first and second modes of operation, wherein said second load is coupled to said bi-directional DC converter at said load terminal in a predetermined arrangement, and a stable voltage is provided to said second load when in said first mode;
   wherein when said supply terminal receives said external power supply,
      said bi-directional DC converter is controlled to operate in a buck mode to charge said rechargeable battery; and
   wherein when said supply terminal receives said first load, said bi-directional
      DC converter is controlled to operate in a boost mode to discharge said rechargeable battery to drive said first load.

2. The power management circuit according to claim 1, further comprising a charge switch electrically coupled between said bi-directional DC converter and said rechargeable battery, and being configured to control a charging current and a discharging current of said rechargeable battery.

3. The power management circuit according to claim 1, further comprising a first switch electrically coupled between said supply terminal and said bi-directional DC converter, wherein said first switch is turned off when said second load operates in said first mode and said supply terminal is electrically coupled to said external power supply.

4. The power management circuit according to claim 1, wherein said bi-directional DC converter comprises:
   second and third switches coupled in series between said supply terminal and ground; and
   said inductor electrically coupled between an intermediate common terminal between said second and third switches and said rechargeable battery;
   wherein said second load is coupled to said rechargeable battery and a common terminal between said supply terminal and said second switch.

5. The power management circuit according to claim 4, further comprising a fifth switch electrically coupled between said rechargeable battery and said second load.

6. The power management circuit according to claim 4, further comprising a sixth switch electrically coupled between a common terminal between said second switch and said supply terminal, and said second load.

7. The power management circuit according to claim 4, wherein said second load is provided with a second stable voltage by said bi-directional DC converter in a buck mode when said second load is in said second mode.

8. The power management circuit according to claim 4, wherein when said second load is in said second mode, said second load is provided said stable voltage by said bi-directional DC converter that is operated in a boost mode that configures said rechargeable battery as a supply voltage.

9. The power management circuit according to claim 1, wherein when said second load comprises a light-emitting diode (LED) load.

10. The power management circuit according to claim 9, wherein said first mode comprises a flashlight mode, and said second mode comprises a torch mode.

* * * * *